Patented Aug. 14, 1951

2,564,278

UNITED STATES PATENT OFFICE 2,564,278

SELECTIVE CONVERSION OF ALKYNE HYDROCARBONS

Gardner C. Ray, Bartlesville, Okla., assignor to Phillips Petroleum Company, a corporation of Delaware No Drawing. Application October 15, 1948, Serial No. 54,839

15 Claims. (Cl. 260—605)

This invention relates to a method of removing alkynes from gaseous mixtures containing the same. In one of the aspects of the invention relates to the removal of small amounts of acetylene from mixtures of normally gaseous hydrocarbons. In one of its more limited modifications it relates to the removal of acetylene impurities from ethylene concentrates and to the concurrent purification of such concentrates and preparation of acetaldehyde.

In the cracking of hydrocarbon oils, or normally gaseous materials, large quantities of gaseous paraffinic and olefinic hydrocarbons are often obtained, together with small amounts of acetylenic hydrocarbons, particularly acetylene (ethyne) itself. The olefinic hydrocarbons are usually separated into their component fractions such as ethylene and lighter, propylene, butene, etc., each fraction containing the corresponding alkyne. Further purification of each of the fractions by fractionation to remove the small amount of alkyne impurity is possible but is not economically feasible due to the small difference in boiling points of the olefin and corresponding alkyne hydrocarbons. As a result, the alkynes are usually removed by selective chemical reaction or by selective absorption to yield a substantially alkyne-free hydrocarbon stream suitable either for further purification or for immediate use. Among these methods of removing acetylenic compounds are selective polymerization or hydrogenation, selective absorption on surface active materials, selective extraction by organic or aqueous solvents, and removal by selective complex formation with silver or mercury salts. It has also been proposed to selectively burn the acetylene in the presence of metallic copper and oxygen with substantially no consumption of other hydrocarbons. In particular, the ethylene and lighter fraction is usually further purified to obtain a substantially pure ethylene stream by means of an absorption process involving cuprous solutions as an absorption medium. Failure to completely remove ethyne from the ethylenic fraction before absorption with the cuprous solutions results in the formation of dangerously unstable copper acetylides which settle out in the form of a slime or sludge. Other methods for removing acetylenic impurities are desirable since the prior methods are usually suitable only for the partial removal of these compounds from mixtures containing substantial proportions of alkynes and are commercially undesirable in requiring high temperatures, low space velocities, and very careful control of operating conditions.

According to the present invention alkynes are removed from other unsaturated or saturated hydrocarbons by passing the alkyne-containing hydrocarbon stream in a gaseous state together with a small quantity of steam at relatively high space velocities over a heated solid copper pyrophosphate catalyst at an elevated temperature, preferably between 230° and 350° C., to produce corresponding aldehydes and other products from the alkynes. It is found that the alkynes are converted in preference to any other hydrocarbon present so that compounds produced from these acetylenic impurities may easily be removed. Prior to the present invention, it could not have been predicted what reactions would occur with respect to other constituents in the hydrocarbon stream in the presence of the catalytic material employed therein. Undesirable side reactions involving unsaturated hydrocarbons other than the alkynes may reasonably have been expected to predominate. However, the selective conversion of the alkyne in the presence of the copper pyrophosphate catalyst is substantially quantitative and is an important feature in the process since it particularly provides a method of removing objectionable alkynes in the purification of olefinic hydrocarbons which are themselves particularly liable to chemical conversion, as well as a method for selectively converting alkynes to aldehydes in the presence of other unsaturated hydrocarbons. The substantially alkyne-free hydrocarbon stream may be separated from the aldehyde conversion product and from other incidentally formed products such as acetone, acetic acid, etc. by suitable means such as fractionation, aqueous extraction, absorption, or scrubbing with glacial acetic acid, and the aldehyde separately recovered, if desired. Since the major portion of the alkynes is converted by the present process into the corresponding aldehydes, the present process is especially applicable concurrently to the preparation and recovery of aldehydes and to the purification of alkyne-contaminated hydrocarbons. The hydrocarbon stream from which the alkynes are to be converted and removed may consist predominantly of one or more olefins or paraffins, or mixtures thereof, and it may also contain other impurities, for example, hydrogen and carbon oxides, which may be removed in a subsequent purification step not forming part of this invention. The amount of alkyne present may vary from a very slight trace to amounts up to 20 or 30 mol per cent, but usually the percentage will range from 0.1 to 5.0 mol per cent. The amount of steam to be admixed with the acetylenic stream is preferably from one to fifteen mols per mol of alkyne to be reacted; but more preferably, about four mols of steam are used. Excesses of steam are not unfavorable to the alkyne conversion reaction and it may be desirable to employ large excesses of steam up to 20 mols or higher, say even 50 mols per mol of alkyne, since upon cooling of the effluent stream the water-soluble conversion products will be expeditiously absorbed in the excess aqueous condensate thereby facilitating their removal from the remaining hydrocarbons. In such case the effluent stream of conversion products need not be further treated to remove aldehyde and other water-soluble conversion products and may be directly treated for olefin removal as described above. The reaction temperature may vary from an elevated temperature sufficiently high to initiate hydration of the alkyne to a temperature below that at which the aldehyde product will decompose, but preferably between about 230° to 350° C. For example, when converting ethyne to acetaldehyde, it is generally preferred to operate at approximately 300° C. The reaction pressure may be slightly higher than atmospheric pressure although it may be as much as several hundred pounds per square inch. The space velocity of the total stream to be treated may advantageously be rather high while effecting complete acetylene removal and may vary from 2 to 8 volumes of gas (calculated at NTP) per volume of catalyst per minute, more preferably from 3 to 6 volumes of gas per volume of catalyst per minute, depending upon the concentration and type of alkyne to be converted.

The catalyst employed in this invention, comprising copper pyrophosphate and activated carbon or other supports, is one that has a long life and high efficiency in converting alkynes to aldehydes as well as effectively producing quantitative selective removal thereof. Although activated carbon is preferred as a support, other materials such as kieselguhr, pumice, bauxite, alumina, asbestos, and similar materials may be effectively used. The ratio of copper pyrophosphate to actived carbon or other support may vary between rather wide limits; however, a ratio of about 1:9 to 5:1 or more preferably 2:1 may be employed. It is not desirable to employ a catalyst containing less than 10 per cent of copper pyrophosphate due to the incomplete conversion of alkynes and because such low concentrations necessarily limit the hydrocarbon space velocities to uneconomically low values. The specific catalysts herein employed may be prepared in a number of ways well known in the art and one desirable means is to impregnate 12-20 mesh supporting material, such as activated carbon or pumice, with a solution of copper pyrophosphate in ammonium hydroxide and thereafter remove water and ammonia by drying in an inert gas stream for several hours at about 400° C.

The following examples illustrate the practical manner in which the invention may be carried into effect, but are not intended to unduly limit its scope. In each example, the catalyst was charged to a catalyst tube and dried several hours at reaction temperature prior to use. A water saturator bath was brought to the temperature required to give a desired steam to acetylene ratio and maintained at this temperature. The feed mixture was then bled into the system from a reservoir through a calibrated orifice type flow-meter, thence through the water saturator, and into the heated reaction zone. The effluent gases were passed through an ice-cooled water-filled bubbler to remove the acetaldehyde and thence through a drying tower filled with a drying agent such as anhydrous calcium sulfate. A bubbler filled with silver nitrate solution placed at the exit end of the drying tower was used to give qualitative visual evidence of the presence of acetylene in the effluent gases by precipitation of silver acetylide. At the completion of a given run, an aliquot portion of the liquid in the water bubbler was analyzed for acetaldehyde and a sample of gas from the exit of the drying tower was taken for acetylene analysis. Total acetylene fed during a run was determined from the length of the run and the orifice calibration.

Example I

A mixture of 2.71 mol per cent acetylene and 97.29 mol per cent ethylene was passed through a water saturator and thence over 50 cc. (31.5 gm.) of a catalyst comprised of 33 weight per cent activated carbon and 67 weight per cent copper pyrophosphate at a temperature of 330° C. and at a flow rate of 200 cc. per minute. The water saturator was operated at such a temperature that a molar ratio of steam to acetylene of 4:1 was obtained before passage of the gas mixture over the catalyst zone. The effluent from the reaction zone contained no detachable amounts of acetylene. Acetaldehyde produced in the reaction zone was extracted from the effluent gases by water and the resultant aqueous mixture analyzed for its acetaldehyde content. It was found that a yield of acetaldehyde of 76 per cent of theory was obtained from acetylene under these conditions.

Example II

Using the catalyst described in Example I and a feed mixture comprising 4.66 mol per cent acetylene and 95.34 mol per cent ethylene at a temperature of 230° C., a flow rate of 300 cc. of feed per minute, and a steam to aceylene ratio of 4:1, it was found that complete acetylene removal was accomplished while effecting a yield of acetaldehyde of 55 per cent of theory. One mol of acetic acid was produced for each 40 mols of acetaldehyde obtained.

Example III

A copper pyrophosphate catalyst supported on 12–20 mesh pumice was prepared by impregnating pumice with a solution of copper pyrophosphate in ammonium hydroxide. Water and ammonia were removed by heating the pumice in an inert gas stream up to about 400° C. for several hours. The resulting catalyst comprised about 10 per cent copper pyrophosphate and 90 per cent pumice by weight.

A feed mixture of 4.7 per cent acetylene and 95.3 per cent ethane was passed through a water saturator held at such a temperature that the molar ratio of steam to acetylene was 4:1 and thence passed over 95 cc. of the above described catalyst at 255° C. and 780 mm. of mercury pressure using a feed flow rate of 150 cc./min. The effluent gas contained 0.3 per cent acetylene. The yield of acetaldehyde was 70 per cent of theory based on the acetylene converted. The remainder of the acetylene was converted to carbon, hydrogen, hydrocarbon polymers, and traces of acetic acid.

From the foregoing examples it can be seen that undesirable acetylenic compounds can be readily converted by the present process to other products, primarily aldehydes, which may be easily separated from hydrocarbons which it is desired to purify. Although the preceding discussion and illustrative examples have emphasized the purification and recovery of ethylene by the hydration of ethyne, the process is readily adaptable to various compositions of alkynes and hydrocarbons and especially to the normally gaseous and readily volatile compounds, such as propyne and butyne in addition to ethyne, when admixed with light saturated and olefinic hydrocarbons.

It will be readily appreciated that various modifications and embodiments of my invention may be practiced, by one skilled in the art, by following the teachings of the present disclosure without departing from the spirit thereof or from the scope of the claims.

I claim:

1. A process for purifying olefinic hydrocarbons containing minor amounts of an alkyne which comprises contacting an olefinic-alkyne mixture with from 1.0 to 15 mols of steam per mol of alkyne at a temperature between 230° and 350° C. in the presence of a catalytic substance comprising copper pyrophosphate and a solid inert supporting agent, and recovering substantially alkyne-free olefinic hydrocarbons from a resulting product.

2. The process of claim 1 wherein the olefin is predominantly propylene and the alkyne is propyne.

3. The process of claim 1 wherein the olefin is predominantly butylene and the alkyne is butyne.

4. A process of purifying olefinic hydrocarbons containing minor amounts of an alkyne which comprises contacting an olefinic-alkyne mixture with between 1.0 and 50 mols of steam per mol of alkyne at a temperature between 230° and 350° C. in the presence of a catalytic substance comprising copper pyrophosphate and a solid inert supporting agent, condensing unreacted steam, absorbing water-soluble conversion products in the resulting aqueous condensate and recovering substantially alkyne-free olefinic hydrocarbons from a resulting product.

5. The process of claim 3 wherein the alkyne is ethyne and the olefin is ethylene.

6. The process of claim 3 wherein the olefin is propylene and the alkyne is propyne.

7. The process of claim 3 wherein the olefin is butylene and the alkyne is butyne.

8. A process for purifying olefinic hydrocarbon containing minor amounts of ethyne which comprises contacting an olefinic-ethyne mixture with from 1.0 to about 15 mols of steam per mol of ethyne at a temperature between 230° and 350° C. in the presence of a catalytic substance comprising an inert supporting agent impregnated with copper pyrophosphate and recovering substantially ethyne-free olefinic hydrocarbons from a resulting product.

9. A process for purifying ethylene containing minor amounts of ethyne which comprises contacting an ethylene-ethyne mixture with from 1.0 to about 15 mols of steam per mol of ethyne at a temperature between 230° and 350° C. in the presence of a catalytic substance comprising an inert supporting agent impregnated with copper pyrophosphate and recovering substantially ethyne-free ethylene from a resulting product.

10. A process for purifying ethylene containing less than 5.0 mol per cent of ethyne which comprises contacting such an ethylene-ethyne mixture with from 1.0 to 20 mols of steam per mol of ethyne at a temperature between 230° and 350° C. in the presence of a catalytic substance comprising about 67 per cent copper pyrophosphate and 33 per cent activated carbon, contacting the total effluent with water and separately recovering substantially ethyne-free ethylene from a resulting product.

11. A process for purifying ethylene containing about 2.7 mol per cent of ethyne which comprises contacting such an ethylene-ethyne mixture with 4 mols of steam per mol of ethyne at a temperature of 330° C. in the presence of a catalytic substance comprising 33 per cent of activated carbon impregnated with 67 per cent of copper pyrophosphate, scrubbing the effluent stream with water and separately recovering substantially ethyne-free ethylene as a product of the process.

12. A process for purifying ethylene containing less than 5.0 mol per cent of ethyne which comprises contacting such an ethylene-ethyne mixture with from 1.0 to 20 mols of steam per mol of ethyne at a temperature between 230° and 350° C. in the presence of a catalytic substance comprising an inert supporting agent impregnated with at least one-ninth but not more than 5 times its weight of copper pyrophosphate, and separately recovering said purified ethylene from the effluent as a product of the process.

13. A process for purifying ethylene and preparing acetaldehyde from an ethylene-ethyne mixture consisting predominantly of ethylene which comprises contacting said mixture with from 1 to 20 mols of steam per mol of ethyne at a temperature between 230° and 350° C. in the presence of a catalyst composed of 10 to 80 per cent copper pyrophosphate impregnated on an inert support, and separately recovering said purified ethylene and said acetaldehyde as products from a resulting effluent.

14. A process for preparing purified ethylene and producing acetaldehyde from an ethylene-ethyne mixture containing less than 5 per cent ethyne which comprises contacting said mixture with from 1 to 15 mols of steam per mol of ethyne at a temperature between 230° and 350° C. in the presence of a catalyst composed of 10 to 80 per cent copper pyrophosphate impregnated on an inert support, and separately recovering said purified ethylene and said acetaldehyde as products from a resulting effluent.

15. A process of preparing an aldehyde from a hydrocarbon mixture containing an alkyne and other unsaturated hydrocarbons which comprises contacting said mixture with steam at a temperature between 230° and 350° C. in the presence of a catalyst comprising copper pyrophosphate, and separately recovering said aldehyde as a product of the process.

GARDNER C. RAY.

REFERENCES CITED

The following references are of record in the file of this patent:

UNITED STATES PATENTS

| Number | Name | Date |
|---|---|---|
| 2,212,593 | Dittrich | Aug. 27, 1940 |
| 2,408,970 | Doumani et al. | Oct. 8, 1946 |

FOREIGN PATENTS

| Number | Country | Date |
|---|---|---|
| 115,765 | Australia | Aug. 21, 1942 |
| 489,360 | Germany | Jan. 17, 1930 |